(12) United States Patent
Yamada

(10) Patent No.: US 11,049,338 B2
(45) Date of Patent: Jun. 29, 2021

(54) INFORMATION PROCESSING APPARATUS, INFORMATION PROCESSING SYSTEM, AND INFORMATION PROCESSING METHOD

(71) Applicant: TOYOTA JIDOSHA KABUSHIKI KAISHA, Toyota (JP)

(72) Inventor: Toshiomi Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/164,199

(22) Filed: Oct. 18, 2018

(65) Prior Publication Data
US 2019/0139331 A1   May 9, 2019

(30) Foreign Application Priority Data
Nov. 6, 2017   (JP) .............................. JP2017-214006

(51) Int. Cl.
| | | |
|---|---|---|
| *G07C 5/02* | (2006.01) | |
| *B60W 40/09* | (2012.01) | |
| *G06Q 30/02* | (2012.01) | |
| *G07C 5/00* | (2006.01) | |

(52) U.S. Cl.
CPC .............. *G07C 5/02* (2013.01); *B60W 40/09* (2013.01); *G06Q 30/0283* (2013.01); *G07C 5/008* (2013.01); *B60W 2530/18* (2013.01); *B60W 2556/45* (2020.02)

(58) Field of Classification Search
CPC ......... B60W 2530/18; B60W 2550/40; B60W 40/09; G06Q 30/0283; G07C 5/008; G07C 5/02
See application file for complete search history.

(56) References Cited

U.S. PATENT DOCUMENTS

| | | | |
|---|---|---|---|
| 9,754,325 B1* | 9/2017 | Konrardy | ................ H04W 4/90 |
| 2008/0065427 A1* | 3/2008 | Helitzer | ................ G06F 19/00 705/4 |
| 2010/0209886 A1* | 8/2010 | Lin | ...................... G09B 19/167 434/65 |
| 2010/0238009 A1* | 9/2010 | Cook | ..................... G07C 5/085 340/439 |
| 2017/0294120 A1 | 10/2017 | Ootsuji | |
| 2018/0074497 A1 | 3/2018 | Tsuji et al. | |

FOREIGN PATENT DOCUMENTS

| | | |
|---|---|---|
| JP | 2002-366829 A | 12/2002 |
| JP | 2006-039642 A | 2/2006 |
| JP | 2016216021 A | 12/2016 |
| NO | 2016/080070 A1 | 5/2016 |

* cited by examiner

Primary Examiner — Christopher Biagini
(74) Attorney, Agent, or Firm — Hunton Andrews Kurth LLP

(57) ABSTRACT

An information processing apparatus includes a processor. The processor is configured to acquire traveling status information indicating a traveling status of a vehicle from the vehicle and determine a driving behavior of a driver of the vehicle based on the traveling status information that a driving assistance function is determined to be not in operation.

14 Claims, 7 Drawing Sheets

FIG. 6

| VEHICLE ID | DATE AND TIME | TRAVELING DISTANCE | SPECIFIC STATUS INFORMATION | DRIVING ASSISTANCE LEVEL | ... |
|---|---|---|---|---|---|
| ... | ... | ... | ... | ... | ... |
| ... | ... | ... | ... | ... | ... |
| : | : | : | : | : | : |

INFORMATION PROCESSING APPARATUS, INFORMATION PROCESSING SYSTEM, AND INFORMATION PROCESSING METHOD

INCORPORATION BY REFERENCE

The disclosure of Japanese Patent Application No. 2017-214006 filed on Nov. 6, 2017 including the specification, drawings and abstract is incorporated herein by reference in its entirety.

BACKGROUND

1. Technical Field

The present disclosure relates to an information processing apparatus, an information processing system, and an information processing method.

2. Description of Related Art

In the related art, a technique that determines driving quality based on detection data of a plurality of sensors provided in a vehicle and decides a used car price or a vehicle insurance premium according to the driving quality has been suggested (for example, Japanese Unexamined Patent Application Publication No. 2006-039642 (JP 2006-039642 A)).

On the other hand, research and development of a driving assistance technique of a vehicle has become widespread, and in the future, autonomous driving without needing positive intervention of a driver is sought.

SUMMARY

When the driving assistance technique is advanced, a part or the whole of the driving operation is acted by the vehicle according to the driving assistance technique. Accordingly, it cannot be said that a driving behavior of the driver is accurately ascertained solely by determining the driving quality using detection data of the sensors provided in the vehicle as it is.

The disclosure provides an information processing apparatus, an information processing system, and an information processing method that improve estimation accuracy of a driving behavior.

A first aspect of the disclosure relates to an information processing apparatus including a processor. The processor is configured to acquire traveling status information indicating a traveling status of a vehicle from the vehicle, and determine a driving behavior of a driver of the vehicle based on the traveling status information that a driving assistance function is determined to be not in operation.

For this reason, it is possible to remove information not appropriate as a determination source of a driving behavior of the driver.

Therefore, it is possible to improve estimation accuracy of a driving characteristic of the driver.

In the information processing apparatus according to the first aspect of the disclosure, the processor may be configured to acquire the traveling status information at a plurality of timings.

For this reason, it is possible to remove information not appropriate as a determination source of a driving behavior of the driver among the traveling status information acquired at the timings.

Therefore, it is possible to improve estimation accuracy of a driving characteristic of the driver.

In the information processing apparatus according to the first aspect of the disclosure, the processor may be configured to further determine whether the traveling status information is information on a traveling status in which the driving assistance function is in operation.

For this reason, it is possible to determine whether or not the traveling status information is appropriate as a determination source of a driving behavior of the driver.

Therefore, it is possible to improve estimation accuracy of a driving characteristic of the driver.

In the information processing apparatus according to the first aspect of the disclosure, the processor may be configured to determine whether the traveling status information is information is information on a traveling status in which the driving assistance function of a predetermined level or more is in operation.

For this reason, it is possible to restrain traveling status information that a driving assistance function with no significant influence on a driving behavior of the driver, such as a simple driving assistance function, is in operation from being removed from information of a determination source of a driving behavior.

Therefore, it is possible to improve estimation accuracy of a driving characteristic of the driver.

In the information processing apparatus according to the first aspect of the disclosure, a determination result of the driving behavior may be used to calculate a charge of a predetermined service.

For this reason, it is possible to provide a predetermined service at a charge according to a driving behavior.

Therefore, it is possible to construct a new business model that a charge is calculated based on a driving behavior for the predetermined service.

In the information processing apparatus according to the first aspect of the disclosure, the predetermined service may be a vehicle lease service, a vehicle purchase service, vehicle insurance, or a car sharing service.

For this reason, it is possible to provide the service at a charge according to a driving behavior.

Therefore, it is possible to construct a new business model that a charge is calculated based on a driving behavior for the service.

In the information processing apparatus according to the first aspect of the disclosure, the processor may be configured to store the acquired traveling status information in a storage device.

In the information processing apparatus according to the first aspect of the disclosure, the traveling status information may be information indicating the occurrence of a specific status relating to traveling of the vehicle.

In the information processing apparatus according to the first aspect of the disclosure, the traveling status information may include a vehicle ID, date and time, a traveling distance, specific status information, and a driving assistance level when the specific status occurs.

A second aspect of the disclosure relates to an information processing system including a first information processing apparatus and a second information processing apparatus. The first information processing apparatus is mounted in a vehicle. The second information processing apparatus is configured to perform communication with the first information processing apparatus through a network. The second information processing apparatus includes a processor. The processor is configured to acquire traveling status information indicating a traveling status of the vehicle from the first information processing apparatus, and determine a driving behavior of a driver of the vehicle based on the traveling status information that a driving assistance function is determined to be not in operation.

For this reason, it is possible to remove information not appropriate as a determination source of a driving behavior of the driver.

Therefore, it is possible to improve estimation accuracy of a driving characteristic of the driver.

A third aspect of the disclosure relates to an information processing method. The information processing method includes acquiring traveling status information indicating a traveling status of a vehicle from the vehicle, and determining a driving behavior of a driver of the vehicle based on the traveling status information that a driving assistance function is determined to be not in operation.

For this reason, it is possible to remove information not appropriate as a determination source of a driving behavior of the driver.

Therefore, it is possible to improve estimation accuracy of a driving characteristic of the driver.

It is possible to improve estimation accuracy of a driving behavior.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a diagram showing a configuration example of a traveling status history storage unit in a table.

DETAILED DESCRIPTION OF EMBODIMENTS

Figure 1:
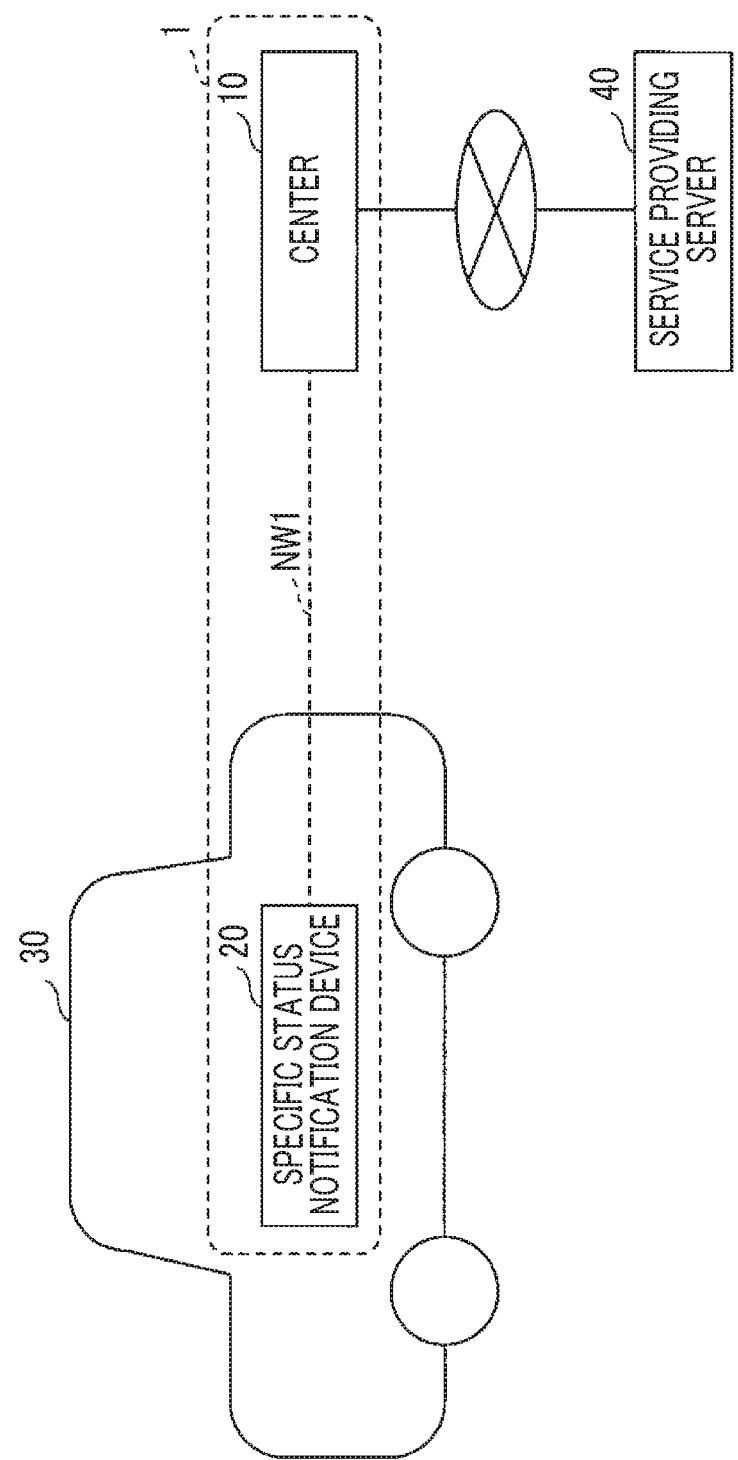
FIG. 1 is a diagram showing a configuration example of an information processing system according to an embodiment of the disclosure.

Hereinafter, an embodiment of the disclosure will be described referring to the drawings. FIG. 1 is a diagram showing a configuration example of an information processing system 1 according to the embodiment of the disclosure. In FIG. 1, the information processing system 1 includes a specific status notification device 20 and a center 10. The specific status notification device 20 and the center 10 can perform communication through a predetermined communication network NW1 including a moving object communication network as a wireless communication network with a large number of base stations as terminals, the Internet network, or the like. In FIG. 1, for convenience, although solely one specific status notification device 20 is shown, the specific status notification devices 20 mounted in a plurality of vehicles 30, respectively, can perform communication with the center 10 through the communication network NW1.

The specific status notification device 20 is an information processing apparatus that is mounted in the vehicle 30, and has an information processing function and a communication function. For example, the specific status notification device 20 may be realized by a predetermined program being installed on an in-vehicle device having a function, such as a navigation system. In the embodiment, when a specific status (hereinafter, referred to as "specific status") relating to traveling of the vehicle 30 is detected, the specific status notification device 20 notifies the center 10 of information (hereinafter, referred to as "traveling status information") indicating the occurrence of the specific status. As an example of the specific status, ignition ON and OFF, a high-risk traveling status, or the like is exemplified. High-risk traveling is, for example, sudden acceleration, sudden braking, overspeed with respect to a legal speed limit, or the like.

The center 10 is a set of one or more computers (information processing apparatuses). In the embodiment, the center 10 acquires (receives) traveling status information from the specific status notification device 20 of the vehicle 30 at a plurality of timings, and generates data (hereinafter, referred to as "driving characteristic data") indicating a behavior, a characteristic, a feature, or the like of driving of a driver of each vehicle 30 based on the traveling status information. In generating driving characteristic data, the center 10 excludes, from original data of driving characteristic data, traveling status information in a period during which a driving assistance function is in operation in the vehicle 30. In this way, it is possible to reflect a behavior of driving of the driver in driving characteristic data with high accuracy.

In FIG. 1, the center 10 is further connected to a service providing server 40 through a network, such as the Internet. The service providing server 40 is a computer system that is provided in an organization (company) providing a predetermined service related to the vehicle 30. As such an organization (hereinafter, referred to as a "service provider"), for example, a lease company that provides a lease service of the vehicle 30, a used car dealer that purchases and sells the vehicle 30, a car-rental company that provides a rental car, an insurance company that sells vehicle insurance, a company that provides a car sharing service, or the like is exemplified. The service providing server 40 receives driving characteristic data from the center 10, and calculates a charge relating to a service provided by the service provider based on the driving characteristic data. For example, a charge is calculated such that a user of a service where driving characteristic data indicating a driving characteristic (driving behavior) with high safety is obtained can benefit.

Figure 2:
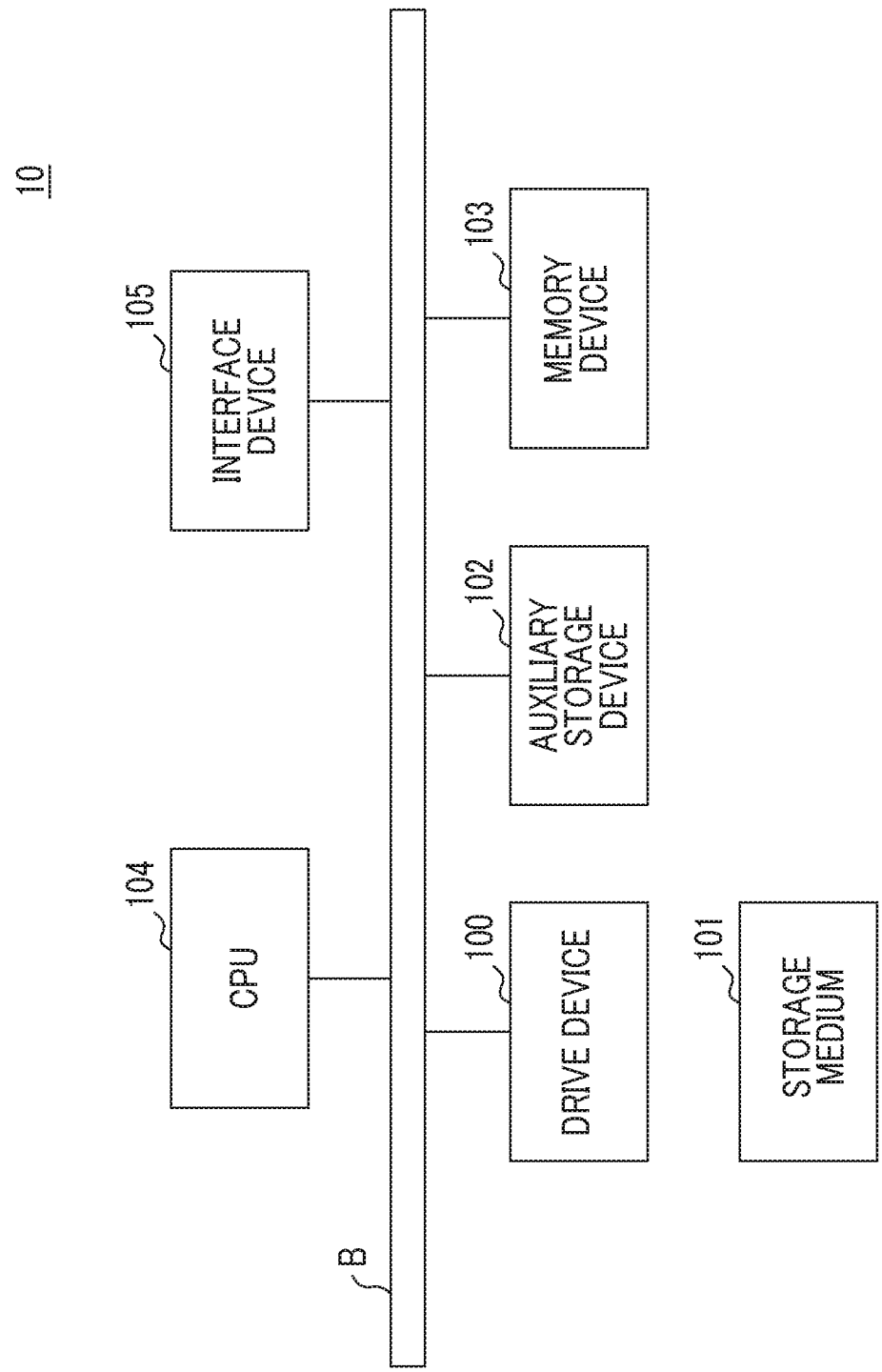
FIG. 2 is a diagram showing a hardware configuration example of a center according to the embodiment of the disclosure.

FIG. 2 is a diagram showing a hardware configuration example of the center 10 according to the embodiment of the disclosure. The center 10 of FIG. 2 has a drive device 100, an auxiliary storage device 102, a memory device 103, a central processing unit (CPU) 104, an interface device 105, and the like connected to one another through a bus B.

A program that realizes processing in the center 10 is provided, for example, by a storage medium 101, such as a compact disk read only memory (CD-ROM). When the storage medium 101 storing the program is set in the drive device 100, the program is installed from the storage medium 101 to the auxiliary storage device 102 through the drive device 100. The installation of the program is not indispensably performed from the storage medium 101, and may be downloaded from another computer through the network. The auxiliary storage device 102 stores the installed program, and stores needed files, data, and the like.

The memory device 103 reads and stores the program from the auxiliary storage device 102 in a case where there is a start instruction of the program. The CPU 104 executes functions related to the center 10 according to the program stored in the memory device 103. The interface device 105 is used as an interface for connection to the network.

Figure 3:
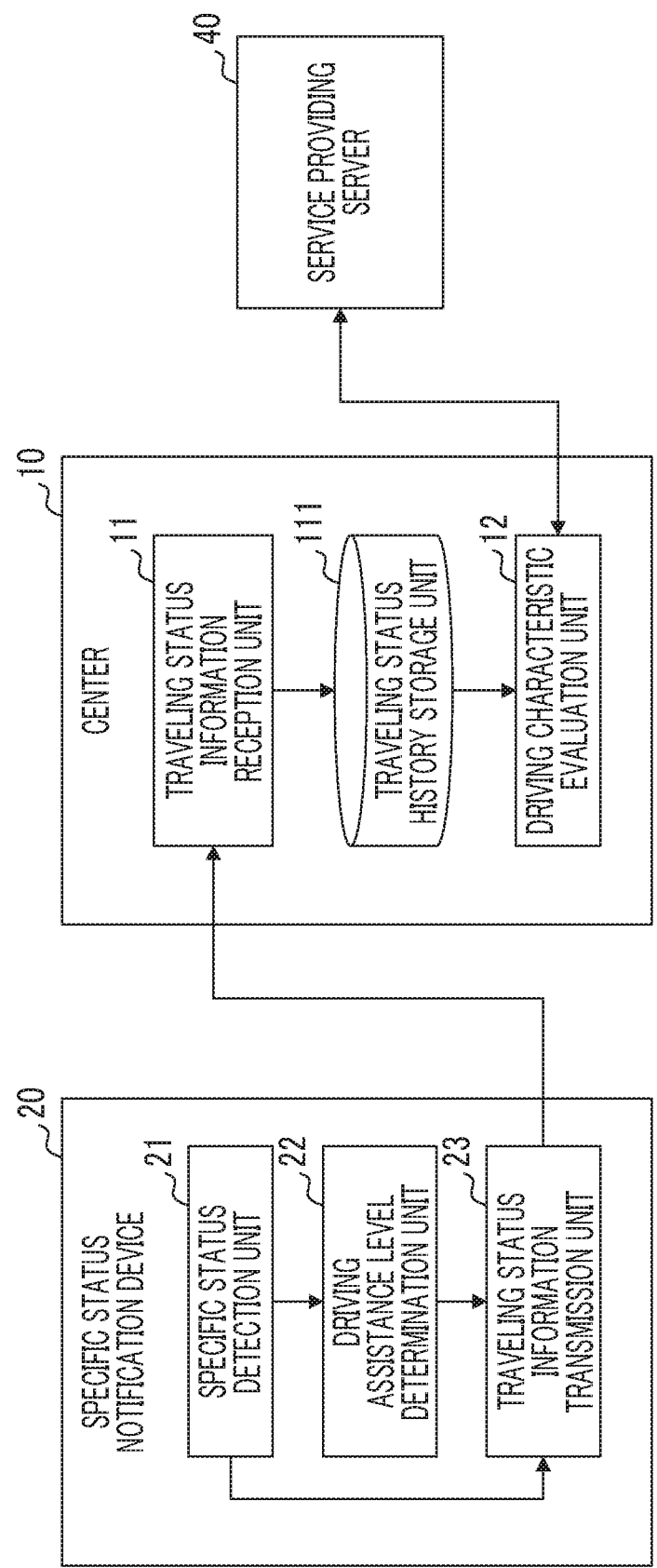
FIG. 3 is a diagram showing a functional configuration example of the information processing system according to the embodiment of the disclosure.

FIG. 3 is a diagram showing a functional configuration example of the information processing system 1 according to the embodiment of the disclosure. In FIG. 3, the specific status notification device 20 has a specific status detection unit 21, a driving assistance level determination unit 22, a traveling status information transmission unit 23, and the like. The units are realized by processing that is executed on the CPU of the specific status notification device 20 by one or more programs installed on the specific status notification device 20.

The specific status detection unit 21 detects the occurrence of a specific status based on measurement data of various sensors provided in the vehicle 30.

The driving assistance level determination unit 22 determines a driving assistance level when the specific status occurs. A driving assistance function refers to a function of assisting or supporting a driving operation for the purpose of maintaining safety during traveling of the vehicle 30 or reducing a burden imposed on the driver, or the like. As an example of the driving assistance function, support of a brake operation, support of a steering wheel operation, or the like is exemplified. The driving assistance level is information indicating the degree of driving assistance according to a level of assistance or support of a driving operation (or a level of a burden of a driving operation imposed on the driver, or the like), and is expressed, for example, by a value of 0 to 5. For example, the acting (that is, autonomous driving) of all driving operations may be defined as the highest level 5. The driving assistance level determination unit 22 determines the driving assistance level, for example, based on operation states of various driving assistance functions (for example, ON/OFF states of driving assistance functions).

The traveling status information transmission unit 23 transmits, to the center 10, traveling status information including information indicating the specific status detected by the specific status detection unit 21, the driving assistance level determined by the driving assistance level determination unit 22 when the specific status occurs, and the like. The traveling status information also includes information (hereinafter, referred to as a "vehicle ID") capable of identifying each vehicle 30.

The center 10 has a traveling status information reception unit 11, a driving characteristic evaluation unit 12, and the like. The units are realized by processing that is executed on the CPU 104 by one or more programs installed on the center 10. The center 10 uses a traveling status history storage unit 111. The traveling status history storage unit 111 is realizable using a storage device or the like that is connectable to the auxiliary storage device 102 or the center 10 through the network.

The traveling status information reception unit 11 receives the traveling status information transmitted from the specific status notification device 20, and stores the traveling status information in the traveling status history storage unit 111. Accordingly, a history of traveling status information received at a plurality of timings is stored in the traveling status history storage unit 111.

For each vehicle 30, the driving characteristic evaluation unit 12 evaluates a driving characteristic based on the history of traveling status information relating to the vehicle 30 and generates driving characteristic data indicating the driving characteristic.

Figure 4:
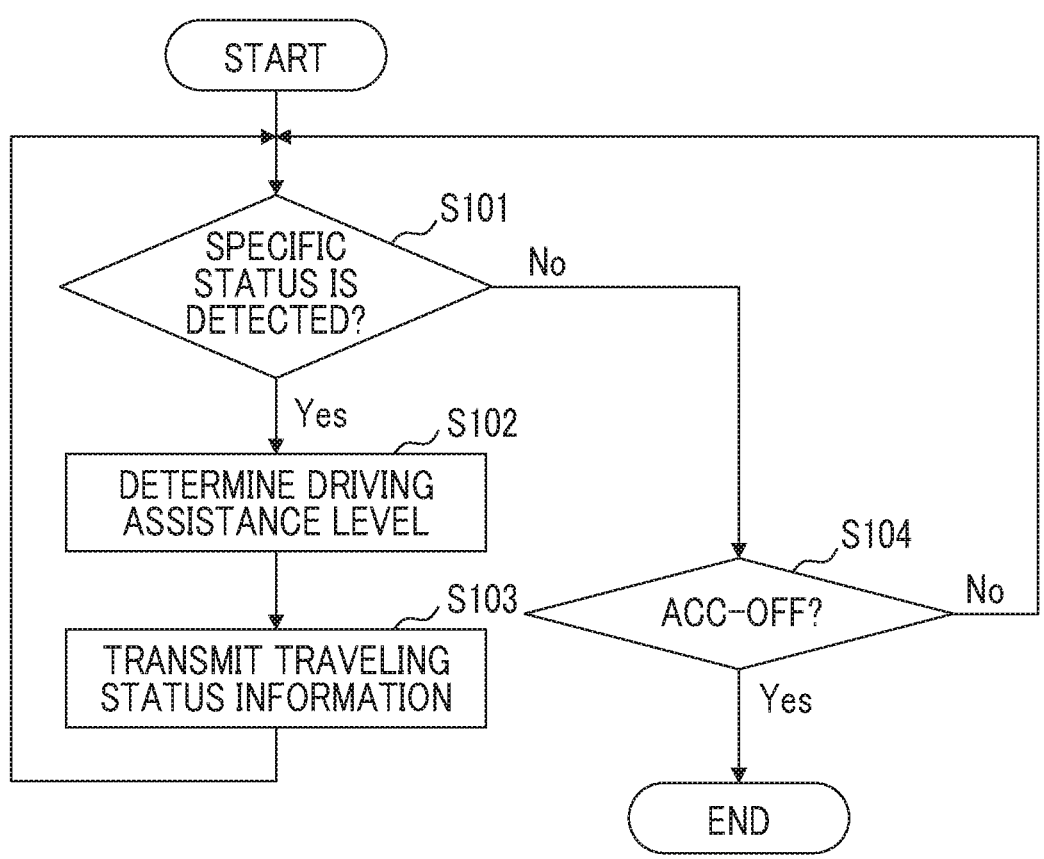
FIG. 4 is a flowchart illustrating an example of a processing procedure that a specific status notification device executes.

Hereinafter, a processing procedure that is executed in the information processing system 1 will be described. FIG. 4 is a flowchart illustrating an example of a processing procedure that the specific status notification device 20 executes. The processing procedure of FIG. 4 is started, for example, when an accessory power supply of the vehicle 30 is ON.

The specific status detection unit 21 is on standby for detection of the occurrence of a specific status (S101). In the embodiment, the occurrence of a status in which ignition is ON (a status of engine start), a status in which ignition is OFF (a status in which the engine is stopped), a status in which an acceleration measured by an acceleration sensor is equal to or greater than a threshold $\alpha$ (a status of sudden acceleration), a status in which a braking distance with respect to a traveling speed (hereinafter, referred to as a "speed before braking") immediately before a brake is depressed is less than a threshold $\beta$ (a status of sudden braking), a status in which a traveling speed measured by a speedometer is equal to or higher than a threshold $\alpha$ with respect to a legal speed limit (a status of overspeed), or the like is an example of the specific status. Other statuses that are estimated to have a high risk, such as sudden steering, may be included in the specific status.

When the specific status detection unit 21 detects the occurrence of any specific status (in S101, Yes), the driving assistance level determination unit 22 determines the driving assistance level in the vehicle 30 at the present time (S102). For example, the driving assistance level may be determined based on the type of a driving assistance function in operation (validated) among one or more driving assistance functions in the vehicle 30. A determination result may be evaluated, for example, by a numerical value of 0 to 5. 0 indicates that no driving assistance function is in operation. In a status of sudden acceleration, an acceleration itself when determination is made to be sudden acceleration may also be included in specific status information. In a status of sudden braking, the speed before braking and the braking distance may also be included in specific status information. In a status of overspeed, the traveling speed may also be included in specific status information. That is, measured data or measurement data when determination is made that there is the specific status may also be included in specific status information.

The traveling status information transmission unit 23 transmits, to the center 10, traveling status information including information (specific status information) indicating the vehicle ID, current date and time, a traveling distance, and the detected specific status, the driving assistance level, and the like (S103). The traveling distance is a measured value (an integrated value of the traveling distance) of a trip meter.

Steps S101 to S103 are continuously executed until ignition is OFF and the accessory power supply is OFF (S104). Accordingly, for each period (hereinafter, the period is referred to as a "trip") during which the engine of one vehicle 30 starts and is then stopped, the traveling status information relating to each specific status detected in the trip is transmitted to the center 10.

In the above description, although an example where the traveling status information is transmitted to the center 10 each time a specific status occurs has been described, at an interval of a given time, the traveling status information for a given time may be collectively transmitted to the center 10 at given time intervals taking into consideration reduction in communication load, or the like. When each trip ends, the traveling status information in the trip may be collectively transmitted to the center 10.

Figure 5:
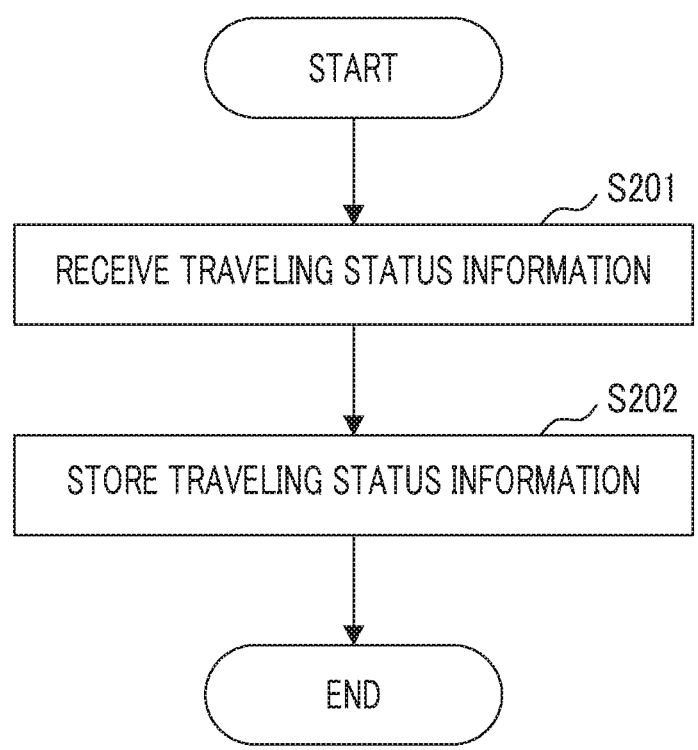
FIG. 5 is a flowchart illustrating an example of a processing procedure that the center executes with reception of traveling status information.

FIG. 5 is a flowchart illustrating an example of a processing procedure that the center 10 executes with reception of traveling status information.

When the traveling status information transmitted from any vehicle 30 is received (S201), the traveling status information reception unit 11 of the center 10 stores the traveling status information in the traveling status history storage unit 111 (S202).

FIG. 6 is a diagram showing a configuration example of the traveling status history storage unit 111. As shown in FIG. 6, one record of the traveling status history storage unit 111 is configured to store "vehicle ID", "date and time", "traveling distance", and "specific status information" of one piece of traveling status information, "driving assistance level", and the like. Accordingly, in a first record of a record group for one trip regarding a certain vehicle 30, "specific status information" is "ignition ON", and in a last record, "specific status information" is "ignition OFF". The record group between the first record and the last record becomes records in which traveling status information relating to specific statuses other than "ignition ON" and "ignition OFF" is stored.

Figure 7:
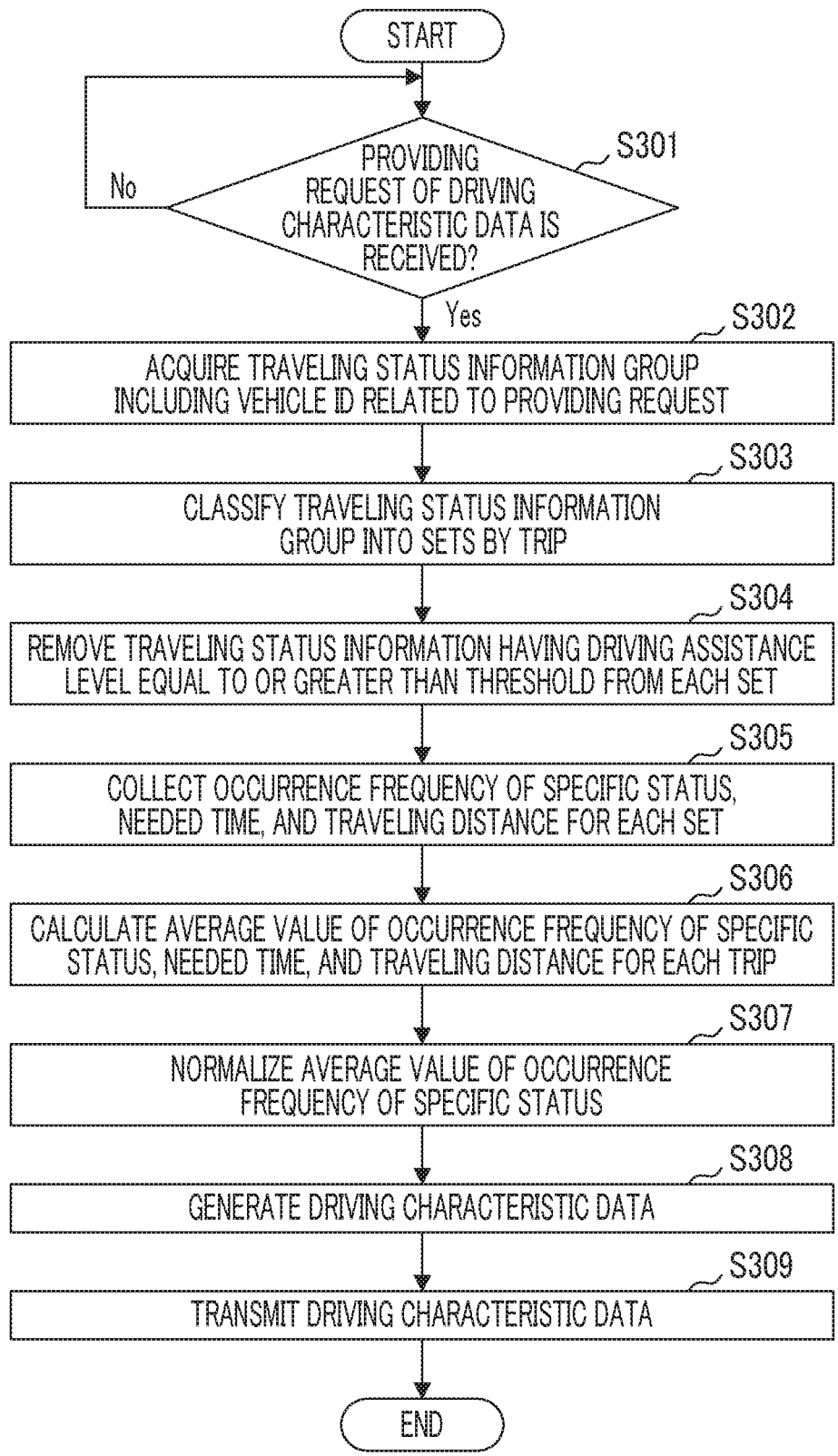
FIG. 7 is a flowchart illustrating an example of a processing procedure of generation processing of driving characteristic data that the center executes.

FIG. 7 is a flowchart illustrating an example of a processing procedure of generation processing of driving characteristic data that the center 10 executes.

The driving characteristic evaluation unit 12 is on standby for reception of a providing request of driving characteristic data transmitted from the service providing server 40 (S301). When the providing request is received (in S301, Yes), the driving characteristic evaluation unit 12 acquires a traveling status information group including a vehicle ID designated in the providing request from the traveling status history storage unit 111 in the order of date and time (S302).

The driving characteristic evaluation unit 12 classifies (divides) the traveling status information group into sets by trip (S303). For example, the traveling status information arranged in the order of the date and time is scanned in order from the top, and the traveling status information included between the traveling status information that "specific status information" is "ignition ON" and the traveling status information that "specific status information" is "ignition OFF" is classified into a set for one trip. This is performed until the last traveling status information acquired in Step S302, whereby a set of traveling status information by trip is generated. Each set also includes the traveling status information that "specific status information" is "ignition ON" and the traveling status information (traveling status information to be a delimiter of a trip) that "specific status information" is "ignition OFF".

The driving characteristic evaluation unit 12 removes the traveling status information having the value of "driving assistance level" equal to or greater than a threshold from each of the sets of traveling status information by trip (S304). That is, the driving characteristic evaluation unit 12 determines whether or not the value of "driving assistance level" is equal to or greater than the threshold regarding the traveling status information belonging to each set, and removes the traveling status information having the value equal to or greater than the threshold from the set.

The threshold may be 1. That is, the traveling status information that any driving assistance function is in operation may be removed. In regard to the threshold, a value equal to or greater than 1 may be set based on an assumption of a status in which is it not possible to conclude that the occurrence of the specific status is caused by a driver's operation. In other words, the threshold may be defined based on an assumption of a status in which it is estimated that the occurrence of the specific status may be caused by the driving assistance function. The traveling status information that "specific status information" is "ignition ON" and the traveling status information (traveling status information to be a delimiter of a trip) that "specific status information" is "ignition OFF" are not removed regardless of the value of "driving assistance level".

The driving characteristic evaluation unit 12 collects (calculates) an occurrence frequency of the specific status, a needed time, and a traveling distance regarding each of the sets of traveling status information by trip (S305). The occurrence frequency of the specific status is calculated by ("the number of pieces of traveling status information included in the set"−2). "−2" means that "ignition ON" and "ignition OFF" are excluded from the occurrence frequency of the specific status. That is, a frequency of a status that is estimated to have a high risk becomes the occurrence frequency. The needed time is an elapsed time from "date and time" of the traveling status information that "specific status information" is "ignition ON" to "date and time" of the traveling status information that "specific status information" is "ignition OFF", in the set. The traveling distance is a value obtained by subtracting "traveling distance" of the traveling status information that "specific status information" is "ignition ON" from "traveling distance" of the traveling status information that "specific status information" is "ignition OFF", in the set.

The driving characteristic evaluation unit 12 calculates an average value of each of the occurrence frequency of the specific status, the needed time, and the traveling distance calculated for each trip (S306). The average value of the occurrence frequency of the specific status can be calculated by dividing the total of the occurrence frequencies of the specific status calculated for the sets (trips) by the number of sets (the number of trips). The average value of the needed time and the average value of the traveling distance can be calculated in the same manner.

The driving characteristic evaluation unit 12 normalizes the average value of the occurrence frequency of the specific status (S307). That is, a concept called a trip is not a concept corresponding to a given length in terms of time or distance. Accordingly, when the driving characteristic of the vehicle 30 is evaluated by the average value for each trip, the vehicle 30 having a short trip becomes advantageous. The normalization is performed in order to remove inconsistency described above.

For example, the normalization may be performed using the average value of the traveling distance. Specifically, the ratio of a reference distance (for example, 1000 km) to the average value of the traveling distance may be calculated, and the occurrence frequency of the specific status per reference distance may be calculated as a normalized occurrence frequency based on the ratio and the average value of the occurrence frequency of the specific status for each trip.

The normalization may be performed using the average value of the needed time. Specifically, the ratio of a reference time (for example, 30 days (24 hours×30 days)) to the average value of the needed time may be calculated, and the occurrence frequency of the specific status per reference time may be calculated as a normalized occurrence frequency based on the ratio and the average value of the occurrence frequency of the specific status for each trip.

The normalization may be performed by other methods.

The driving characteristic evaluation unit 12 generates driving characteristic data based on the normalized occurrence frequency (S308). For example, thresholds TH1 to TH4 in four steps may be compared with the occurrence frequency, and driving characteristic data may be expressed by numerical values (1 to 5) in five steps. Specifically, a case where the occurrence frequency is less than the threshold TH1 may be expressed by 1, a case where the occurrence frequency is less than the threshold TH2 may be expressed by 2, a case where the occurrence frequency is less than the threshold TH3 may be expressed by 3, a case where the occurrence frequency is less than the threshold TH4 may be expressed by 4, a case where the occurrence frequency is equal to or greater than the threshold TH4 may be expressed by 5, and driving characteristic data indicating that driving with higher safety is performed when the value is smaller may be generated. The number of thresholds (the number of steps of driving characteristic data) is just an example. Driving characteristic data may be generated by other methods.

The driving characteristic evaluation unit 12 transmits generated driving characteristic data as a response to the providing request received in Step S301 to the service providing server 40 (S309).

In the center 10, correspondence information of a vehicle ID and a driver ID of the driver may be stored. In this case, a driver ID may be designated in the providing request received in Step S301. The driving characteristic evaluation unit 12 may convert the driver ID to the vehicle ID based on the correspondence information, and may execute Step S302 and later. In this way, it is possible to provide the service providing server 40 requesting driving characteristic data regarding a certain person with driving characteristic data regarding the certain person.

In the above-description, although an example where driving characteristic data is generated based on the normalized value of the average value of the occurrence frequency of the specific status for each trip has been described, driving characteristic data may be generated based on a cumulative value of the occurrence frequency of the specific status for the same vehicle ID. This is because the specific status is a status in which abrasion or deterioration of parts of the vehicle 30 may be increased, and it is considered that the degree of abrasion or deterioration may be more accurately ascertained based on the cumulative value.

The service providing server 40 that receives driving characteristic data calculates a charge relating to a service using any method suitable for the service.

For example, the service providing server 40 of a lease company can construct a business model such that a part of an increase in used car sales price is returned to a lease contractor who has driving characteristic data with high safety when the lease is expired.

A used car dealer can construct a business model such that a purchase price of the vehicle 30 related to driving characteristic data indicating a driving characteristic with high safety is increased.

A car-rental company can construct a business model such that a rental charge of a customer who has driving characteristic data indicating a driving characteristic with high safety regarding the vehicle 30 is discounted when the vehicle 30 is returned.

An insurance company can construct a business model such that an insurance premium of a contractor who has driving characteristic data indicating a driving characteristic with high safety is reduced.

A company that provides a car sharing service can construct a business model such that a service charge of a customer who has driving characteristic data indicating a driving characteristic with high safety is reduced.

For other services, a charge may be calculated based on driving characteristic data.

As described above, according to the embodiment, regarding the traveling status information indicating the traveling status of the vehicle 30, traveling status information that a driving assistance function of a certain level or more is in operation and traveling status information that a driving assistance function of a certain level or more is not in operation are distinguished, and the driving characteristic (driving behavior) of the driver is determined based on the latter traveling status information. For this reason, it is possible to remove information not appropriate as a determination source of the driving characteristic (driving behavior) of the driver. Therefore, it is possible to improve the estimation accuracy of the driving characteristic of the driver.

In the embodiment, the driving characteristic (driving behavior) is determined based on traveling status information that a predetermined driving assistance level among driving assistance levels in a plurality of steps is not in operation. For this reason, it is possible to restrain traveling status information that a driving assistance function with no significant influence on the driving characteristic (driving behavior) of the driver, such as a simple driving assistance function, is in operation from being removed from information of the determination source of the driving characteristic (driving behavior). Therefore, it is possible to improve the estimation accuracy of the driving characteristic of the driver.

In the embodiment, the center 10 is an example of an information processing apparatus and a second information processing apparatus. The traveling status information reception unit 11 is an example of an acquisition unit. The driving characteristic evaluation unit 12 is an example of a first determination unit and a second determination unit. The specific status notification device 20 is an example of a first information processing apparatus.

Although the embodiment of the disclosure has been described above in detail, the disclosure is not limited to such a specific embodiment, and various modifications and alterations may be made without departing from the spirit and scope of the disclosure described in the claims.

What is claimed is:
1. An information processing apparatus comprising a processor configured to:
acquire traveling status information indicating a traveling status of a vehicle from the vehicle, the traveling status including at least one of (i) a status in which an acceleration measured by an acceleration sensor provided in the vehicle is equal to or greater than an acceleration threshold, (ii) a status in which a braking distance with respect to a traveling speed immediately before a brake is depressed is less than a braking distance threshold, and (iii) a status in which a traveling speed measured by a speedometer provided in the vehicle is equal to or higher than a speed threshold with respect to a legal speed limit,
divide the traveling status information into sets, remove, from the sets, the traveling status information that a driving assistance function is determined to be in operation,
calculate an occurrence frequency of a specific status regarding each of the sets in which the traveling status information that a driving assistance function is determined to be in operation, has been removed,
calculate an average value of each of the occurrence frequency of the specific status,
normalize the average value,
determine a driving behavior of a driver of the vehicle based on the normalized average value, and
output the driving behavior of the driver of the vehicle to a service providing server, wherein
the driving assistance function is a function of assisting or supporting a driving operation for the purpose of maintaining safety during traveling of the vehicle or reducing a burden imposed on the driver,
the average value of the occurrence frequency of the specific status is normalized using an average value of travelling distance or using an average value of needed time,
using the average value of the traveling distance includes: calculating a first ratio of a reference distance to the average value of the traveling distance, and calculating the average value of the occurrence frequency of the specific status per reference distance as the normalized average value of the occurrence frequency based on the first ratio and the average value of the occurrence frequency of the specific status,
using the average value of the needed time includes; calculating a second ratio of a reference time to the average value of the needed time, and calculating the average value of the occurrence frequency of the specific status per reference time as the normalized average value of the occurrence frequency based on the second ratio and the average value of the occurrence frequency of the specific status, and
the service providing server calculates a charge relating to a predetermined service provided by a service provider based on the driving behavior of the driver, the service provider being at least one of a car lease company, a used car dealer, an insurance company and a car sharing company.

2. The information processing apparatus according to claim 1, wherein the processor is configured to acquire the traveling status information at a plurality of timings.

3. The information processing apparatus according to claim 1, wherein the processor is configured to further determine whether the traveling status information is information on a traveling status in which the driving assistance function is in operation.

4. The information processing apparatus according to claim 3, wherein the processor is configured to determine whether the traveling status information is information on a traveling status in which the driving assistance function of a predetermined level or more is in operation.

5. The information processing apparatus according to claim 1, wherein a determination result of the driving behavior is used to calculate the charge of the predetermined service.

6. The information processing apparatus according to claim 5, wherein the predetermined service is a vehicle lease service, a vehicle purchase service, vehicle insurance, or a car sharing service.

7. The information processing apparatus according to claim 1, wherein the processor is configured to store the acquired traveling status information in a storage device.

8. The information processing apparatus according to claim 1, wherein the traveling status information is information indicating occurrence of a specific status relating to traveling of the vehicle.

9. The information processing apparatus according to claim 1, wherein the traveling status information includes a vehicle ID, date and time, a traveling distance, specific status information, and a driving assistance level when the specific status occurs.

10. The information processing apparatus according to claim 1, wherein the driving assistance function is a function of supporting a brake operation or a steering wheel operation.

11. An information processing system comprising:
a first information processing apparatus mounted in a vehicle; and
a second information processing apparatus configured to perform communication with the first information processing apparatus through a network, wherein
the second information processing apparatus includes a processor configured to:
acquire traveling status information indicating a traveling status of the vehicle from the first information processing apparatus, the traveling status including at least one of (i) a status in which an acceleration measured by an acceleration sensor provided in the vehicle is equal to or greater than an acceleration threshold, (ii) a status in which a braking distance with respect to a traveling speed immediately before a brake is depressed is less than a braking distance threshold, and (iii) a status in which a traveling speed measured by a speedometer provided in the vehicle is equal to or higher than a speed threshold with respect to a legal speed limit,
divide the traveling status information into sets,
remove, from the sets, the traveling status information that a driving assistance function is determined to be in operation,
calculate an occurrence frequency of a specific status regarding each of the sets in which the traveling status information that a driving assistance function is determined to be in operation, has been removed,
calculate an average value of each of the occurrence frequency of the specific status,
normalize the average value,
determine a driving behavior of a driver of the vehicle based on the normalized average value, and
output the driving behavior of the driver of the vehicle to a service providing server, wherein
the driving assistance function is a function of assisting or supporting a driving operation for the purpose of maintaining safety during traveling of the vehicle or reducing a burden imposed on the driver,
the average value of the occurrence frequency of the specific status is normalized using an average value of travelling distance or using an average value of needed time,
using the average value of the traveling distance includes: calculating a first ratio of a reference distance to the average value of the traveling distance, and calculating the average value of the occurrence frequency of the specific status per reference distance as the normalized average value of the occurrence frequency based on the first ratio and the average value of the occurrence frequency of the specific status, using the average value of the needed time includes; calculating a second ratio of a reference time to the average value of the needed time, and calculating the average value of the occurrence frequency of the specific status per reference time as the normalized average value of the occurrence frequency based on the second ratio and the average value of the occurrence frequency of the specific status, and the service providing server calculates a charge relating to a predetermined service provided by a service provider based on the driving behavior of the driver, the service provider being at least one of a car lease company, a used car dealer, an insurance company and a car sharing company.

12. The information processing system according to claim 11, wherein the driving assistance function is a function of supporting a brake operation or a steering wheel operation.

13. An information processing method comprising:

acquiring traveling status information indicating a traveling status of a vehicle from the vehicle, the traveling status including at least one of (i) a status in which an acceleration measured by an acceleration sensor provided in the vehicle is equal to or greater than an acceleration threshold, (ii) a status in which a braking distance with respect to a traveling speed immediately before a brake is depressed is less than a braking distance threshold, and (iii) a status in which a traveling speed measured by a speedometer provided in the vehicle is equal to or higher than a speed threshold with respect to a legal speed limit, dividing the traveling status information into sets, removing, from the sets, the traveling status information that a driving assistance function is determined to be in operation, calculating an occurrence frequency of a specific status regarding each of the sets in which the traveling status information that a driving assistance function is determined to be in operation, has been removed, calculating an average value of each of the occurrence frequency of the specific status, normalizing the average value, determining a driving behavior of a driver of the vehicle based on the normalized average value, and outputting the driving behavior of the driver of the vehicle to a service providing server, wherein the driving assistance function is a function of assisting or supporting a driving operation for the purpose of maintaining safety during traveling of the vehicle or reducing a burden imposed on the driver, the average value of the occurrence frequency of the specific status is normalized using an average value of travelling distance or using an average value of needed time, using the average value of the traveling distance includes: calculating a first ratio of a reference distance to the average value of the traveling distance, and calculating the average value of the occurrence frequency of the specific status per reference distance as the normalized average value of the occurrence frequency based on the first ratio and the average value of the occurrence frequency of the specific status, using the average value of the needed time includes; calculating a second ratio of a reference time to the average value of the needed time, and calculating the average value of the occurrence frequency of the specific status per reference time as the normalized average value of the occurrence frequency based on the second ratio and the average value of the occurrence frequency of the specific status, and the service providing server calculates a charge relating to a predetermined service provided by a service provider based on the driving behavior of the driver, the service provider being at least one of a car lease company, a used car dealer, an insurance company and a car sharing company.

14. The information processing method according to claim 13, wherein the driving assistance function is a function of supporting a brake operation or a steering wheel operation.

* * * * *